United States Patent Office 3,004,949
Patented Oct. 17, 1961

3,004,949
STABILIZATION OF VINYL CHLORIDE POLYMERS WITH SULFUR CONTAINING COMPOUNDS
Fernand Chevassus, Paris, France, assignor to National Lead Company, New York, N.Y., a corporation of New Jersey
No Drawing. Filed Sept. 6, 1957, Ser. No. 682,288
Claims priority, application France Oct. 11, 1956
3 Claims. (Cl. 260—45.75)

This invention relates to novel stabilizing agents for vinyl polymers and copolymers, more especially stabilizing agents for polyvinyl chlorides, as well as chlorinated derivatives useful in plasticizing vinyl chlorides (e.g. chlorinated paraffins, chlorinated naphthalenes and chlorodiphenyls).

It is known that the compounds of the class in question resist heat and light poorly; they yellow and lose hydrochloric acid. It appears that this disadvantage results from a phenomenon which causes the intervening formation of double linkages, which then take up oxygen, according to the following schematic reactions:

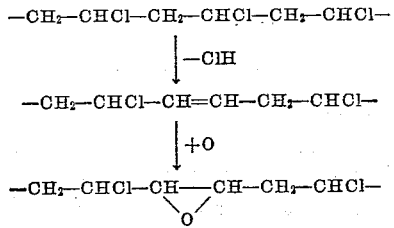

The phenomena in question can proceed to the formation of peroxides which are themselves susceptible to decomposition accompanied by splitting of the molecule at the peroxide linkage, which, in turn, leads to the degradation of the polymeric material.

In order to avoid this disadvantage it has been previously proposed to use various stabilizing agents which were always either compounds capable of combining with hydrochloric acid, or anti-oxidants.

However, the degradation of the vinyl polymers and copolymers being due essentially to the decomposition of the peroxides already formed on the polymeric chain, the applicant contemplates that by deactivating these harmful peroxides in order to bring about a more stable form in which oxygen has lost its reactivity, it will be possible to retard effectively this degradation and even to prevent it completely.

An object of this invention, therefore, is to provide improved stabilizing agents for vinyl resins. Another object is to provide improved vinyl halide resin compositions, having increased resistance to the degrading action of heat and light. Still another object is to provide stabilized vinyl halide resin compositions in which the peroxide groups present in the polymeric chain are deactivated and therefore do not take part in reactions which result in degradation of the polymer. Other objects and advantages will become apparent from the following more complete description and claims.

Broadly, this invention comprises a halogen-containing substance selected from the group consisting of vinyl halide resins and chlorinated plasticizers containing, as stabilizer therefor, a sulphur-containing compound selected from the group consisting of aromatic thioacids and salts thereof, thioamides, mercaptopyridine and mercaptopyrimidine and substitution products thereof, dithiocarbamates, thiuram sulfides, mercaptoimidazoles, and metallic salts thereof, aromatic mercaptans, dibenzamido-diphenyl disulfide, mercaptobenzimidazole and its metallic salts, mercaptobenzothiazole and substitution products thereof, mercaptobenzothiazole sulfides and N-cyclohexyl-2-benzothiazyl sulfonamide.

I have discovered that the above-identified organic compounds containing one or more thio- or mercapto-groupings, preferably activated by a cyclical or heterocyclical structure, are very effective in stabilizing vinyl polymers and copolymers and, in particular, polyvinyl chloride.

The stabilizing agents according to the present invention comprise the following groups of compounds:

The alkaline and alkaline earth derivatives of monothiobenzoic acid,
The thio-amides, for example, thiobenzamide and dithioxyamide,
The derivatives of thiopyrimidine and of thiopyridine, especially 2-mercapto-4,5-dimethylpyrimidine, 2-mercaptodihydroxypyrimidine, and 2,4,6-trimercapto-pyrimidine,
The dithiocarbamates,
The thiuram sulfides,
2-mercapto-imidazoline,
Naphthyl-mercaptan and xylyl-mercaptan,
Dibenzamido-diphenyl disulfide.

More particularly the invention relates to the following preferred stabilizing agents:
(1) Mercapto-benzimidazole and its metallic salts, especially the mercaptobenzimidazolates of zinc, sodium, cadmium and tin.
(2) Mercaptobenzothiazole and its derivatives, particularly mercaptobenzothiazol disulfide.
(3) N-cyclohexyl-2-benzothiazyl sulfonamide.

It has been observed that the addition of these stabilizing agents, in amounts equal to or above 0.1% by weight in relation to the weight of the resin or of the chlorinated plasticizer to a plasticized vinyl polymeric or copolymeric composition effectively retards the degradation of the composition which expresses itself by an increase in the stability toward light and heat, and by an enhancement of certain mechanical properties such as resistance to rupture, elongation at break, and freedom from discoloration during aging.

Amounts less than 0.1% of stabilizer do not contribute sufficient stability to make an acceptable resin composition when used alone, although they may, if desired, be used in conjunction with other stabilizing agents.

There is no sharply-defined upper limit on the amount of stabilizer to be employed. In general, the degree of stabilization desired will determine the amount of stabilizer used. Amounts of stabilizer higher than about 5% by weight, based on the weight of the resin or of the chlorinated plasticizer are uneconomical and do not contribute additional stability proportionate to the amount of stabilizer used.

Still more effective results are obtained by using the stabilizing agents of the present invention in combination with a known anti-oxidant, such as 2,6-di-tert-butyl-4-methyl-phenol, or with a known stabilizer such as barium or cadmium laurate.

In addition, the invention is illustrated by the following examples which, it is understood, do not in any way limit the invention thereto. In these examples either the mercaptobenzimidazol or the mercapto-benzothiazol or its disulfide, or the N-cyclohexyl-2-benzothiazol sulfonamide may be used interchangeably as stabilizer.

The useful stabilizers are not limited to those just above listed but may include particularly dithiocarbamates, thiuram sulfides, naphthyl or xylyl mercaptans, but these latter are not preferred because of the increased cost of stabilization resulting from their use or by reason of the slight odor they impart to mixtures containing them.

The vinyl resin compositions modified according to the present invention are subjected to tests with a view to determining the improvement in their stability to heat, light, and aging.

EXAMPLE I

Samples 2.5 mm. thick are prepared by molding from the following plastic compositions:

|  | Control | Test piece |
|---|---|---|
| polyvinyl chloride (suspension polymer) | 100.00 | 100.00 |
| dioctyl phthalate (D.O.P.) | 60.00 | 60.00 |
| mercaptobenzimidazol (dispersed in the D.O.P.) | -------- | 0.15 |

Each sample was placed in a hot air drying oven at 165° C. under test conditions ASTM D794-44T until a pale yellow color corresponding to "color No. 6" on the Gardner scale developed. The time necessary for the development of this color was respectively 30 minutes and 45 minutes for the control piece and test piece.

Tests of thin sheets (about ½ mm. thick) give even more marked results since the time required for the development of the samt coloration was respectively 18 and 34 minutes.

Tests carried out with plasticizers other than D.O.P. gave comparable results.

It is therefore concluded that mercaptobenzimidazol notably retards the development of coloration and consequently the degradation of vinyl resins by heat.

EXAMPLE II

There was incorporated into the plastic compositions prepared according to Example I an anti-oxidant of the type, 2,6-di-tert-butyl-4-methyl-phenol which is, as it happens, the product sold under the commercial name of "Ionol" by the Shell Company, whose use as a stabilizer for mixtures based on polyvinyl chlorides has been made the object of French Patent No. 1,031,083 of January 17, 1951.

Test samples were prepared as in Example I starting with the following plastic compositions:

|  | Parts by weight | | |
|---|---|---|---|
| polyvinyl chloride | 100.00 | 100.00 | 100.00 |
| D.O.P. | 60.00 | 60.00 | 60.00 |
| mercaptobenzimidazol |  | 0.15 | 0.15 |
| "Ionol" |  |  | 0.15 |

The times required for the development of "color No. 6" for the thick test pieces were respectively 30 minutes, 45 minutes, and 60 minutes for the control and test pieces No. I and No. II. Tests carried out with plasticizers other than D.O.P. gave comparable results.

It appears therefore, that the use of an inhibitor of the type of mercaptobenzimidazol, preferably in combination with an anti-oxidant (test piece II) produces a remarkable stabilization of plastic mixtures comprising polyvinyl chloride toward heat. Similar results were obtained when replacing the mercaptobenzimidazol by mercaptobenzothiazol or mercaptobenzolthiazol disulfide.

EXAMPLE III

Known stabilizers such as barium or cadmium laurate were incorporated in plastic compositions prepared according to Example I. Mercaptobenzimidazol and its zinc and sodium salts, with and without combination with "Ionol" were employed. Test pieces were prepared as in Example I starting with the following plastic compositions (see Table I below):

The mercaptobenzimidazol used in combination with barium laurate or cadmium laurate effectively enhances the stability of polyvinyl chloride mixtures (test Piece II); this action being still much more pronounced with the zinc salt (test Piece IV). The efficacy of the sodium salt of mercaptobenzimidazol was inferior to that of the mercaptobenzimidazol itself or the zinc salt thereof. The use of mercaptobenzimidazol as well as its zinc salt in combination with "Ionol" give excellent results (test Pieces III and V).

*Table I*

|  | Control | Test Piece I | Test Piece II | Test Piece III | Test Piece IV | Test Piece V | Test Piece VI |
|---|---|---|---|---|---|---|---|
| Polyvinyl Chloride | 100.00 | 100.00 | 100.00 | 100.00 | 100.00 | 100.00 | 100.00 |
| D.O.P. | 60.00 | 60.00 | 60.00 | 60.00 | 60.00 | 60.00 | 60.00 |
| Barium or Cadmium Laurate |  |  | 3.00 | 3.00 | 3.00 | 3.00 | 3.00 |
| Mercaptobenzimidazol or Mercaptobenzothiazol |  |  | 0.15 | 0.15 |  |  |  |
| Zinc Mercaptobenzimidazol |  |  |  |  | 0.25 |  | 0.25 |
| Sodium Mercaptobenzimidazol |  |  |  |  |  | 0.20 |  |
| "Ionol" |  |  |  |  |  |  | 0.15 |
| Time for Development of "Color No. 6" on the Gardner Scale for Thick Sheets, min | 30 | 75 | 90 | 115 | 120 | 70 | 140 |

EXAMPLE IV

Thin sheet test samples were prepared from plastic compositions of Example III and tested in a fadeometer. The times necessary for development of "color No. 6" (Gardner scale) were noted as follows:

| Control | Test Piece I | Test Piece II | Test Piece III | Test Piece IV | Test Piece V | Test Piece VI |
|---|---|---|---|---|---|---|
| 100 | 210 | 220 | 230 | 230 | 290 | 260 |

(Time in hours.)

At the end of these periods the control and test piece No. I were hard and brittle while the other sampled were still supple. Sodium mercaptobenzimidazolate and the combination of zinc mercaptobenzimidazolate with the antioxidant of the "Ionol" type imparted to the polyvinyl chloride mixture an excellent stability toward light. Practically the same results are obtained with plasticizers other than D.O.P. Results identical to those shown for test pieces II and III are obtained by replacing mercaptobenzimidazol with mercaptobenzothiazol or its disulfide.

EXAMPLE V

By adding to a suspension of polyvinyl chloride 10% of dibutyltin mercaptobenzimidazolate a stabilization is obtained analogous to that realized with 3.0% of dibutyltin dilaurate.

EXAMPLE VI

A primary insulation mixture is obtained starting with the following compositions:

|  | Control | Test Piece I | Test Piece No. II |
|---|---|---|---|
| Polyvinyl chloride | 100.00 | 100.00 | 100.00 |
| D.O.P. | 50.00 | 50.00 | 50.00 |
| "Dythal" (Dibasic lead phthalate) | 4.00 | 4.00 | 4.00 |
| Stearic acid | 0.25 | 0.25 | 0.25 |
| Mercaptobenzimidazol | | | 0.15 |
| "Ionol" | | | 0.15 |
| Calcined kaolin | 6.00 | 6.00 | 6.00 |
| Chalk | 4.00 | 4.00 | 4.00 |

All parts in the above compositions are parts by weight.

The resistance to rupture and the elongation at break characteristics before and after aging at 100° C. for ten days are given in the following table:

|  | Control | | Test Piece I | | Test Piece III | |
|---|---|---|---|---|---|---|
|  | R[1] | E[2] | R | E | R | E |
| Before aging | 165 kg | 290% | 163 kg | 300% | 165 kg | 285% |
| After 10 days' aging, 100° C. | 148 kg | 185% | 160 kg | 240% | 163 kg | 250% |
| Percent resistance maintained. | 89 | | 98 | | 98 | |
| Percent elongation at break maintained. | 65 | | 80 | | 87 | |

[1] Resistance to rupture.
[2] Elongation at break.

It will be observed that the incorporation of mercaptobenzimidazol alone or in combination with the "Ionol" to a polyvinyl chloride plastic composition effectively enhances the resistance to aging which is expressed by reinforcement of the mechanical properties of the plastic composition such as resistance to rupture and elongation at break during aging brought about by the action of heat.

EXAMPLE VII

Mercaptobenzimidazol (or mercaptobenzothiazol) dissolved in a high boiling solvent are added to a dispersion of polyvinyl chloride prepared by polymerization in emulsion in amount equal to 0.2% by weight based on the polyvinyl chloride. There is obtained a mixture which remains transparent during gelation while an identical plastic mixture, not treated with the mercaptobenzimidazol changes color to clear chestnut.

The use of the stabilizers of the present invention, alone or in combination with known anti-oxidants, therefore, efficaciously retards the development of discoloration of vinyl resin compositions and enhances the stability to heat (Examples I, II, III, and VII) to light (Example IV), and to aging (Example VI), and these stabilizing characteristics apply equally to chlorinated plasticizers.

EXAMPLE VIII

By the addition to a chlorinated paraffin of an inhibitor of the mercaptobenzimidazol type or similar product in an amount of 0.2%, the stability of the plasticizer or vinyl compositions containing it is strongly increased.

While this invention has been described with reference to certain specific embodiments and illustrated by certain examples, these are illustrative only, and the invention is not to be construed as limited, except as set forth in the appended claims.

I claim:

1. A vinyl chloride polymer composition containing, as color stabilizer therefor, a substance selected from the group consisting of mercaptobenzothiazol disulfide, mercaptobenzimidazol, and the zinc, sodium, cadmium, and tin salts of mercapto-benzimidazol, and having said stabilizer present in amounts no less than 0.1%.

2. A vinyl chloride polymer composition containing, as color stabilizer therefor, a substance selected from the group consisting of mercaptobenzothiazol disulfide, mercaptobenzimidazol, and the zinc, sodium, cadmium, and tin salts of mercapto-benzimidazol, and having said stabilizer present in amounts no less than 0.1%, and as an anti-oxidant 2,6-di-tert-butyl-4-methyl-phenol.

3. A vinyl chloride polymer composition containing, as color stabilizer therefor, a substance selected from the group consisting of mercaptobenzothiazol disulfide, mercaptobenzimidazol, and the zinc, sodium, cadmium, and tin salts of mercapto-benzimidazol, and having said stabilizer present in amounts no less than 0.1%, and as a second stabilizing compound, a metal soap selected from the group consisting of barium laurate and cadmium laurate.

References Cited in the file of this patent

UNITED STATES PATENTS

| 2,050,843 | Jacobsohn | Aug. 11, 1936 |
| 2,259,122 | Walker | Oct. 14, 1941 |
| 2,405,008 | Berry et al. | July 30, 1946 |
| 2,432,296 | Dorough | Dec. 9, 1947 |
| 2,538,047 | Sanders et al. | Jan. 16, 1951 |
| 2,713,580 | Stefl | July 19, 1955 |
| 2,802,811 | Somerville et al. | Aug. 13, 1957 |

FOREIGN PATENTS

| 616,282 | Great Britain | Jan. 19, 1949 |
| 969,154 | France | Dec. 15, 1950 |
| 1,031,083 | France | Jan. 17, 1951 |
| 1,061,221 | France | Apr. 9, 1954 |
| 1,144,496 | France | Apr. 23, 1957 |